March 12, 1957 J. STEFANIK 2,784,840
SALESMEN'S SAMPLE TRAY FOR CERAMIC
AND OTHER FRAGILE OBJECTS
Filed March 24, 1954 2 Sheets-Sheet 1

INVENTOR.
JOHN STEFANIK
BY
ATTORNEY

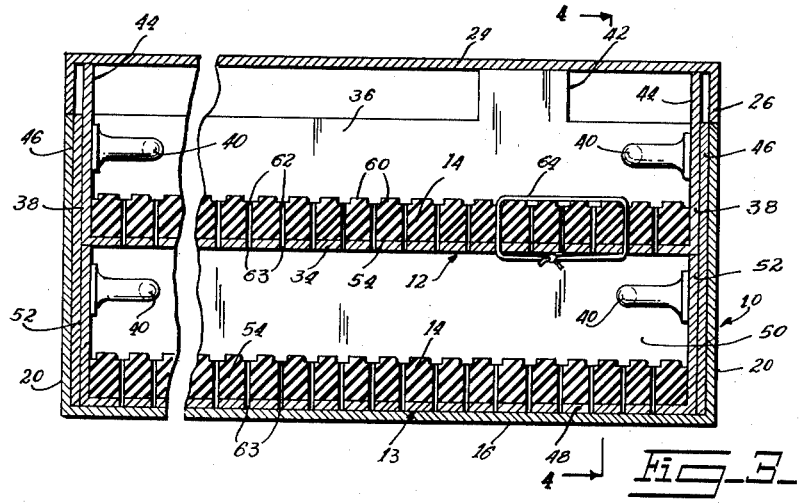
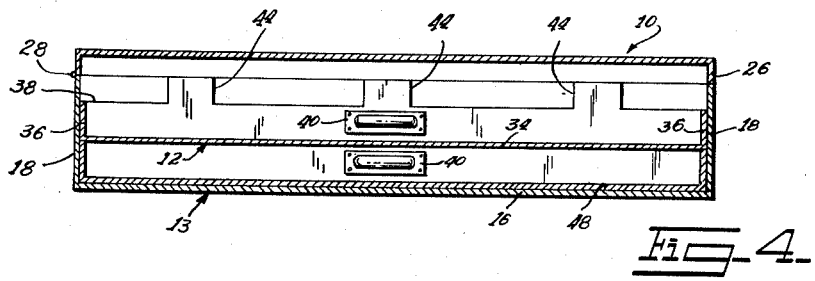
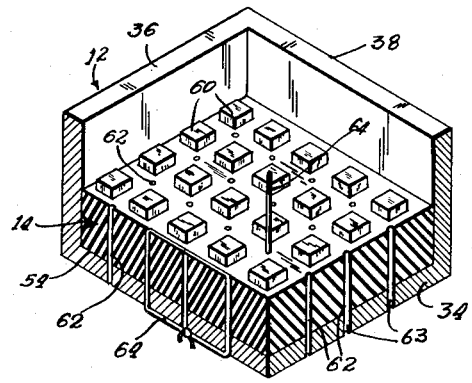

United States Patent Office 2,784,840
Patented Mar. 12, 1957

2,784,840

SALESMEN'S SAMPLE TRAY FOR CERAMIC AND OTHER FRAGILE OBJECTS

John Stefanik, Passaic, N. J.

Application March 24, 1954, Serial No. 418,437

1 Claim. (Cl. 206—72)

This invention relates to a salesman's sample or carrying case so designed as to permit the carrying of any of various small, irregularly or regularly shaped, fragile objects. The invention is more particularly a flat, box-like container, in which one or more removable trays are positioned, with said trays being so designed as to efficiently hold in place a selected object or objects, such as ceramic figurines, fragile items of chinaware, etc.

A problem exists in connection with the carrying of relatively expensive, highly fragile objects, by salesmen. Small works of art, collectors' items such as old china, and similar articles fall within this category, and it is very difficult to insure against breakage, chipping, or cracking of the objects during their movement from place to place.

The main object of the present invention is to provide a generally improved device for supporting ceramic and other fragile objects, which will afford maximum protection therefor under circumstances such as those indicated above.

A more specific object is to so design the device as to permit it to hold efficiently objects varying widely from one another as to size and shape.

A further object is to provide, in a tray, a liner or insert of soft, resilient, cushioning material such as sponge or foam rubber, which liner will be so formed as to cause the fragile object to rest entirely thereon without possibility of shifting into engagement with a hard-surfaced portion of the device.

A further object is to include, in the formation of the liner, a plurality of spaced, sponge or foam rubber projections integrally or otherwise permanently secured to the flat body of the liner, with said projections defining irregularities in the object-supporting surface of the liner, in a manner that will further serve to engage the supported articles against movement from their assigned position.

Still another purpose is to include in the liner resilient band elements which can be arranged in any way desired so as to be extendable over the object at a plurality of locations on the object, even when the object is irregularly shaped, thereby to cooperate with the projections in holding the object against shifting.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 3 is a longitudinal sectional view on line 3—3 of Fig. 2, part being broken away.

Fig. 4 is a transverse sectional view on line 4—4 of Fig. 3.

Fig. 5 is an enlarged, fragmentary perspective view of one corner of one of the trays and of the liner carried thereby.

Figure 1:
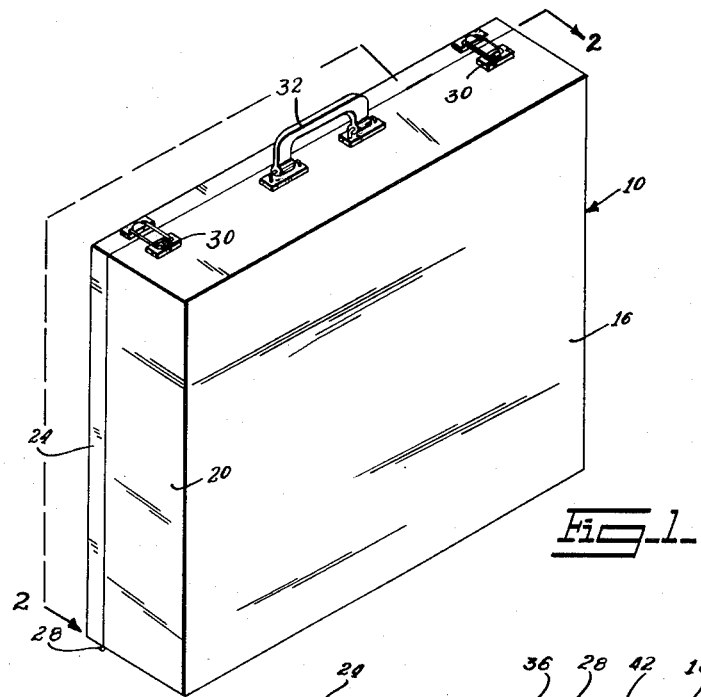
Fig. 1 is a perspective view of the sample case as it appears when being carried.
Figure 2:
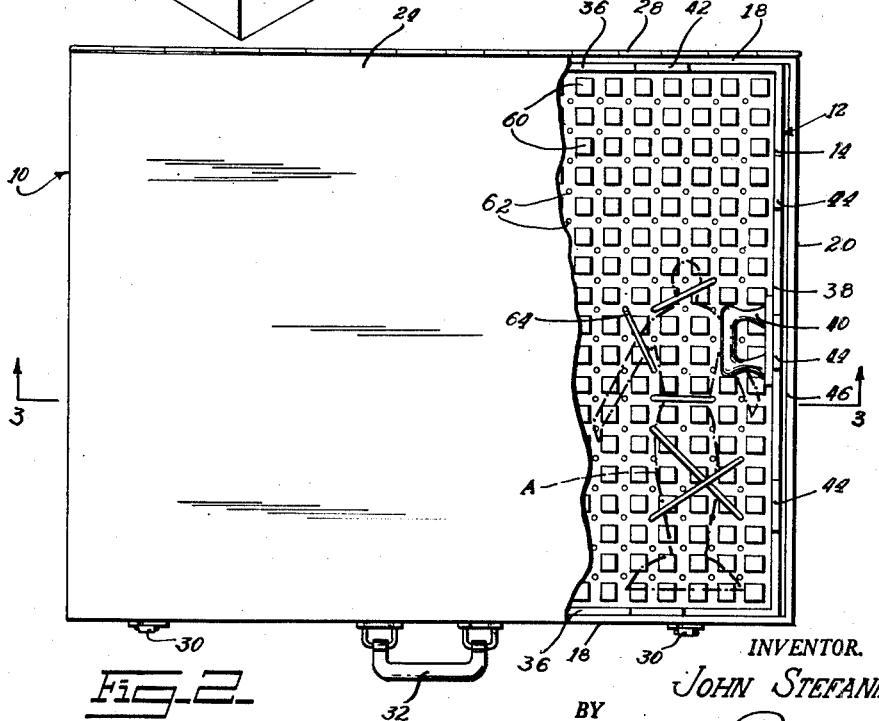
Fig. 2 is a view partly in section and partly in elevation, on line 2—2 of Fig. 1.

The reference numeral 10 has been applied generally in the several figures of the drawing to a thin, flattened container in which upper and lower trays 12, 13, respectively, provided with inserts or liners 14, are supported.

The container 10, in the illustrated embodiment, is of rectangular configuration. It is provided with a flat bottom 16, integral at its opposite side edges with upstanding side walls 18, and at its end edges with end walls 20, the end walls being secured fixedly at their end edges to the end edges of the side walls. A lid 24, formed with a depending peripheral flange 26 that engages against the upper edges of the side and end walls, is adapted to close the open top of the container. The lid is connected along one side to one of the side walls 18 by a hinge 28, and on its other side, has latch elements cooperating with latch elements 30 on the other side wall 18 for the purpose of releasably engaging the lid in closed position. A handle 32 on the latch-provided side wall 18 of the container facilitates carrying of the sample case.

The upper tray 12 is adapted to fit snugly but removably within the container, and is formed with a flat bottom plate 34, upstanding side walls 36 the upper edges of which register with the upper edges of the container side walls 18, and end walls 38, the tray being formed throughout as a rigid assembly. Secured to the inner surfaces of the end walls of the upper tray are handles 40 that facilitate the lifting of the tray from the container whenever articles are to be placed in, removed from, or displayed upon the tray.

Integrally formed upon the side walls 36 at spaced intervals therealong are upstanding spacer members 42, said members being formed as rectangular ears the upper edges of which are adapted to engage against the underside of the lid when the lid is closed, thus to prevent upward movement of the tray within the container. End spacer members 44, spaced along the end walls 38, and shaped similarly to the side spacer members 42, engage against the underside of the lid at the ends of the lid, to cooperate with the side spacer members in holding the tray against upward motion.

To hold the trays against endwise movement, spacer plates 46 are inserted removably in the container, between the end walls of the trays and container, respectively.

The lower tray 13 is formed similarly to the upper tray 12, so far as its basic construction is concerned, but does not have the upstanding spacer members 42, 44. Thus, the lower tray has a flat bottom plate 48 adapted to seat against the bottom of the container, side walls 50, and end walls 52. The upper edges of the walls 50, 52 engaged against and support the bottom plate 34 of the upper tray, and as a result, both trays will be held against movement relative to one another or relative to the container. The trays, of course, can be readily removed whenever necessary.

The liners 14 associated with the respective trays are formed identically to one another, and thus the description of one will suffice for the other. Each liner is formed with a flat, rectangular body 54 of sponge or foam rubber, said body completely covering the bottom plate of its associated tray and engaging against the side and end walls of the tray. The body 54 has its upper surface formed with uniformly spaced, upstanding projections 60 of foam or sponge rubber, having flat upper surfaces, said projections being of rectangular shape.

In the spaces between the projections, openings 62 are formed in the body, said openings extending fully from the top to the bottom surface of the body and registering with openings 63 of the trays. The openings 62, 63 are adapted to receive the end portions of rubber band elements 64. The elements 64 are arranged in any way desired upon the body, to hold an object A in place thereon.

Each band element has its intermediate portion normally lying in snug engagement with the upper surface of the body, and has its end portions extending downwardly through openings 62, 63. The terminals of the band elements are folded under the body and are knotted together.

By reason of this arrangement, it will be seen that the band means is thus adapted to be resiliently lifted, for insertion of the fragile object A, which in the illustrated example is a ceramic figurine. The object will thus be held against the upper surface of the body 54 of the liner, and will be engaged at a plurality of locations by selected band elements. As a result, despite the irregular shape of the figurine or other object, it will be held against the body, and cannot shift in any direction. The projections cooperate, of course, by forming an irregular upper surface on the body which will aid in holding the object against movement.

The band elements, in addition, serve to resiliently tie the liners to the bottoms of the trays.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

A tray for fragile objects comprising a body having bottom, side and end walls, said bottom wall having a plurality of spaced openings therein, a lining for the bottom wall in the nature of sponge rubber snugly received within the body, the upper surface of said lining lying in a plane below the planes of the rims of the side and end walls, integrally formed spaced projections on the upper surface of the lining, said lining having a plurality of spaced openings in alignment with the openings in the bottom wall, and elastic bands extending through pairs of spaced aligned openings in the lining and bottom wall for holding the lining on the base and for holding articles of various shapes and sizes on the lining, said bands being arranged in irregular array, with portions of at least some of the bands extending over some of the projections, and the remaining portions extending over the spaces between the projections, and rectangular-shaped ears spaced along the upper edges of the side and end walls for stacking purposes, and handles on the inner surfaces of opposed side walls extending inwardly of the body.

References Cited in the file of this patent
UNITED STATES PATENTS

| | | |
|---|---|---|
| 82,817 | Fenn | Oct. 6, 1868 |
| 261,651 | Baker | July 25, 1882 |
| 430,477 | Kjesbu et al. | June 17, 1890 |
| 659,802 | Rohlfs | Oct. 16, 1900 |
| 1,201,979 | Noyes | Oct. 17, 1916 |
| 1,926,916 | Reeves | Sept. 12, 1933 |
| 1,941,922 | Worth | Jan. 2, 1934 |
| 2,038,990 | Barr | Apr. 28, 1936 |
| 2,282,908 | Thompson | May 12, 1942 |
| 2,287,425 | Fox | June 23, 1942 |
| 2,409,748 | Folst | Oct. 22, 1946 |
| 2,664,195 | Mues | Dec. 29, 1953 |

FOREIGN PATENTS

| | | |
|---|---|---|
| 10,380 | Great Britain | May 6, 1898 |
| 32,631 | Netherlands | May 15, 1934 |